(12) United States Patent
Zhodzishsky

(10) Patent No.: US 8,190,716 B2
(45) Date of Patent: May 29, 2012

(54) METHOD AND SYSTEM FOR MANAGING BLUETOOTH COMMUNICATION USING SOFTWARE OR FIRMWARE FILTERING

(75) Inventor: Victor Zhodzishsky, Potomac, MD (US)

(73) Assignee: Broadcom Corporation, Irvine, CA (US)

( * ) Notice: Subject to any disclaimer, the term of this patent is extended or adjusted under 35 U.S.C. 154(b) by 164 days.

(21) Appl. No.: 12/001,311

(22) Filed: Dec. 11, 2007

(65) Prior Publication Data

US 2009/0055516 A1 Feb. 26, 2009

Related U.S. Application Data

(60) Provisional application No. 60/957,890, filed on Aug. 24, 2007.

(51) Int. Cl.
*G06F 15/177* (2006.01)
(52) U.S. Cl. .................................. 709/220; 713/100
(58) Field of Classification Search .......... 709/220–223; 455/41.1–41.2; 713/100
See application file for complete search history.

(56) References Cited

U.S. PATENT DOCUMENTS

| | | | | |
|---|---|---|---|---|
| 7,167,721 B2* | 1/2007 | Jung | ......................... | 455/553.1 |
| 7,336,645 B2* | 2/2008 | Hur et al. | ...................... | 370/350 |
| 7,546,099 B2* | 6/2009 | Trost et al. | .................. | 455/186.1 |
| 7,596,353 B2* | 9/2009 | Chung et al. | .................. | 455/41.2 |
| 2003/0078002 A1* | 4/2003 | Sanjeev et al. | .................. | 455/41 |
| 2004/0109441 A1* | 6/2004 | Hur et al. | ...................... | 370/352 |
| 2005/0266798 A1* | 12/2005 | Moloney et al. | ............. | 455/41.2 |
| 2006/0068760 A1* | 3/2006 | Hameed et al. | ............. | 455/412.1 |
| 2006/0135065 A1* | 6/2006 | Lee et al. | ...................... | 455/41.1 |
| 2006/0146777 A1* | 7/2006 | Ami et al. | ...................... | 370/338 |
| 2006/0224742 A1* | 10/2006 | Shahbazi | ....................... | 709/226 |
| 2006/0270347 A1* | 11/2006 | Ibrahim et al. | ............... | 455/41.2 |
| 2007/0105548 A1* | 5/2007 | Mohan et al. | .............. | 455/426.1 |
| 2007/0199060 A1* | 8/2007 | Touboul | .......................... | 726/11 |
| 2010/0064341 A1* | 3/2010 | Aldera | .............................. | 726/1 |

* cited by examiner

*Primary Examiner* — Abdullahi Salad
(74) *Attorney, Agent, or Firm* — Thomas, Kayden, Horstemeyer & Risley, LLP

(57) ABSTRACT

Aspects of method and system for managing secure Bluetooth communication using software or firmware filtering are provided. In this regard, the IT or system administration may select one or more Bluetooth profiles for Bluetooth devices and inform the host software on the selection. The host software passes the information to host control interface (HCI). A Bluetooth security filter is integrated into the HCI to ensure a security policies set for the Bluetooth device. The Bluetooth security filter may be part of the Bluetooth host stack or the Bluetooth host controller stack. All HCI packets such as HCI commands, HCI events and HCI data packets are parsed in the Bluetooth security filter and act upon the policies determined by the IT or system administration.

20 Claims, 6 Drawing Sheets

METHOD AND SYSTEM FOR MANAGING BLUETOOTH COMMUNICATION USING SOFTWARE OR FIRMWARE FILTERING

CROSS-REFERENCE TO RELATED APPLICATIONS/INCORPORATION BY REFERENCE

This patent application makes reference to, claims priority to and claims benefit from U.S. Provisional Patent Application 60/957,890, filed on Aug. 24, 2007.

The above stated application is hereby incorporated herein by reference in its entirety.

FIELD OF THE INVENTION

Certain embodiments of the invention relate to wireless communication. More specifically, certain embodiments of the invention relate to method and system for managing Bluetooth communication using software or firmware filtering.

BACKGROUND OF THE INVENTION

Bluetooth wireless technology is set to revolutionize personal connectivity by providing freedom from wired connections. Bluetooth is a specification for a small form-factor, low-cost radio solution providing links between mobile computers, mobile phones and other portable and handheld devices.

Bluetooth wireless technology is an international, open standard for allowing intelligent devices to communicate with each other through wireless, short-range communications. This technology allows any sort of Bluetooth compliant device: from computers and cell phones to keyboards and headphones to make its own connections, without wires, cables or any direct action from a user. Bluetooth is currently incorporated into numerous commercial products including laptops, PDAs, cell phones, and printers, with more products coming out every day.

On a PC Windows platform equipped with Bluetooth device, configuration such as Bluetooth usage model selection, Bluetooth profile settings and device access rights are normally managed by users themselves through a Bluetooth configuration tool. This tool can be a Windows application used to configure the Protocol Stack Core consisting of multiple modules implementing the Bluetooth functionality as defined in the Bluetooth specification.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for managing Bluetooth communication using software or firmware filtering, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in method and system for managing secure Bluetooth communication using software or firmware filtering. Various aspects of the invention may provide a secure Bluetooth communication. The IT or system administrator may specify Bluetooth device configuration and may select one or more Bluetooth profiles for a Bluetooth device and inform the host software of the selection. The host software may communicate the received information to the HCI in Bluetooth stack and the Bluetooth device may be configured accordingly. One embodiment of the invention may comprise integrating a Bluetooth security filter into the HCI to ensure secure communication on the Bluetooth device. In this regard, the Bluetooth security filter may be integrated as part of the Bluetooth host stack or as part of the Bluetooth host controller stack. HCI packets such as HCI commands, HCI events and HCI data packets are parsed in the Bluetooth security filter and act upon the device configuration determined by the IT or system administration.

Figure 1:
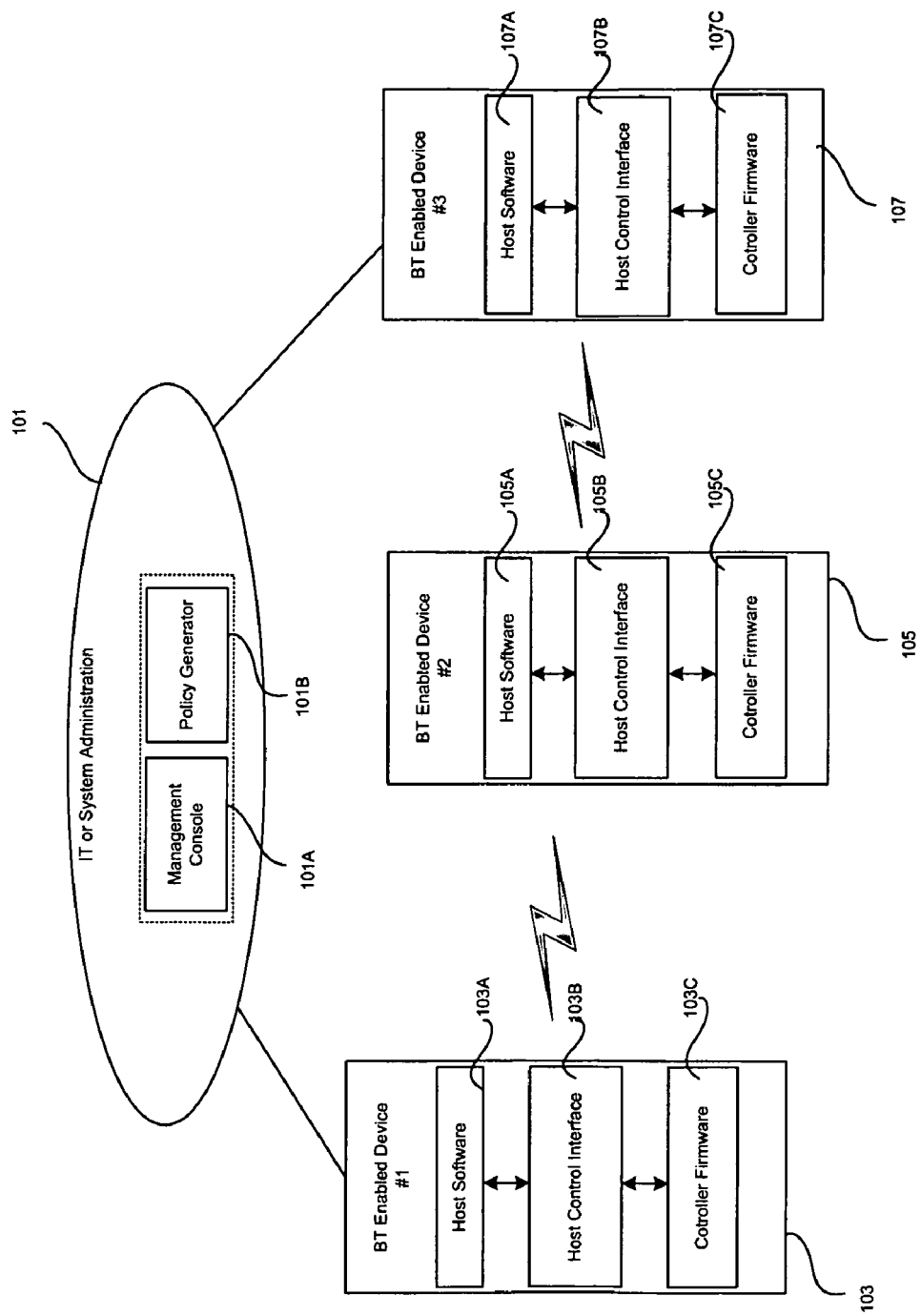
FIG. 1 is a block diagram of an exemplary system for managing Bluetooth communication using software or firmware filtering, in accordance with an embodiment of the invention.

FIG. 1 is a block diagram of an exemplary system for managing Bluetooth communication using software or firmware filtering, in accordance with an embodiment of the invention. Referring to FIG. 1, there is shown an IT or system administration block 101, a first Bluetooth enabled devices 103, a second Bluetooth enabled device 105, and a third Bluetooth enabled device 107. The IT or system administration block 101 may comprise a management console 101A and a policy generator 101B.

The management console 101A may comprise suitable logic circuitry and/or code that may enable system administrators to manage hardware, software, and networking components. In accordance with an embodiment of the invention, the management console 101A may comprise tools to that may be utilized to delegate specific administrative permissions to devices, group of devices, users or groups of users.

The policy generator 101B may comprise suitable logic circuitry and/or code that may enable creation and tailoring of one or more Bluetooth policy objects for different users or user groups per Bluetooth usage model. In accordance with an embodiment of the invention, the various generated Bluetooth policy objects may be based on secured devices and corresponding desired security level. The policy generator 101B may be integrated with the management console 101A.

The IT or system administration block 101 may comprise suitable logic circuitry and/or code that may enable IT or system administrators to perform remote configuration and/or updates on client Bluetooth enabled devices using various IT tools that may be controlled from the management console 101A. Various embodiments of the invention may enable the IT administration block 101 to limit Bluetooth usage models and Bluetooth profile settings for each of the Bluetooth enabled device 103, 105 and 107. In this way, the device configuration may be exercised remotely by an administrator within the IT administration block 101.

Each of the Bluetooth enabled devices 103, 105 and 107 may comprise respective host software 103A, 105A and 107A, respective Host Controller Interfaces (HCI) 103B, 105B and 107B, and respective Controller Firmware 103C, 105C and 107C. The respective host software 103A, 105A and 107A for the corresponding Bluetooth enabled devices 103, 105 and 107 may implement the Bluetooth stack such that they may run as a software system on the corresponding host such as the Bluetooth enabled devices 103, 105 and 107. Applications requiring Bluetooth functionality are considered a part of the host software.

Each of the corresponding Host Controller Interface 103B, 105B and 107B may comprise suitable logic, circuitry and/or code that may be enabled to provide a standardized interface between the HCI layer implemented in software on the host and the HCI layer residing in firmware on the Bluetooth device. Each of the respective Host Controller Interfaces 103B, 105B and 107B may be enabled to handle commands, events and data packets defined in the Bluetooth specification. For example, an application packet may be split into several HCI command packets at host software, and resulting HCI command packets comprising HCI commands may be passed to the Host Control Interface such as 103B for further process.

Each of the respective Controller Firmware components 103C, 105C and 107C may comprise suitable logic circuitry and/or code that may enable Bluetooth communication. For example, each of the respective Controller Firmware components 103C, 105C and 107C may enable Bluetooth Link Manager and Bluetooth Link Controller layers as defined in Bluetooth specification.

Each of the Bluetooth enabled devices 103, 105 and 107 may comprise suitable logic circuitry and/or code to support different Bluetooth Usage Modes and corresponding Bluetooth profiles. The usage models describe how Bluetooth be used, while a profile may specify a list of mandatory and optional features that a device should implement. A communication profile defines precisely how parameters may be coded, and also specifies the communication procedures to guarantee interoperability between different kinds of products.

In operation, the generator 101B may create and tailor one or more usage model specific Bluetooth profiles for Bluetooth devices, for example, the Bluetooth device 103. The management console 101A may inform the host software 103A of the selected Bluetooth profiles for the Bluetooth device 103 application data. The host software 103A may generate corresponding HCI commands for the received application data and pass to the HCI 103B to determine which kinds of HCI commands occurred. The HCI 103B may provide a standardized interface with commands that may be utilized by HCI 103C to enable Bluetooth Link Manager and Bluetooth Link Controller layers as defined in Bluetooth specification.

Unlike local Bluetooth settings and access rights, which are normally managed by users, access rights and/or policy settings may be specified by a system administrator utilizing the management console 101A in the IT or system administration block 101. The administrator may manage these access rights and/or policy settings from the single location, namely, the IT or system administration block 101 without physically touching machines in the organization.

Using the management console 101A, an administrator at the IT or system administration block 101 may restrict certain Bluetooth general features, for example, discoverability or association with a new device, as well as enable or disable certain types of the connections. It may also enable adding a list of trusted devices which may be allowed to use all Bluetooth features installed on the computer.

A group policy application or infrastructure may be utilized to enable secure communication for Bluetooth devices 103, 105, and 107. In this regard, any standardized tool may be utilized for editing and distributing group policy settings, as well as managing computers or groups of computers may be utilized. Accordingly, administrators may add both computers and users to security groups and specify which security group may be affected by Bluetooth policy settings.

A system administrator may be provided with a la cart choice of settings which may be allowed or disallowed per computer by utilizing the management console 101A within the IT or system administration block 101. The a la cart choice of settings may be displayed on the management console 101A. In this regard, in an instance where a Bluetooth usage is completely disabled, the security filter will not allow Bluetooth stack to initialize Bluetooth device. In some instances, the administrator may force the Bluetooth enabled device to be invisible to other devices.

In typical Bluetooth environment some of the Bluetooth devices mostly computers may be managed, for example, the Bluetooth devices 103 and 107, while others like cell phones may be not managed, for example, the Bluetooth device 105. Communications between the managed Bluetooth devices 103 and 107, and not managed Bluetooth device 105 may be regulated by security policy applied to the managed Bluetooth devices 103 and 107.

The Bluetooth protocol utilizes a Bluetooth protocol stack to transfer data and to implement features that are required by various applications. The Bluetooth protocol stack may compromise a plurality of layers. The Bluetooth protocol stack may be partitioned between a dedicated Bluetooth processor, and an external Host. The partitioning may occur at the HCI layer, which may result in a two-processor architecture, or an embedded architecture stack. The upper layers of the Bluetooth stack may be implemented in software, which may be run as an executable on the host system. Applications requiring Bluetooth functionality may communicate with the executable. At the lower portion of the Bluetooth stack are the firmware layers that are usually implemented as part of the Bluetooth device itself. Various Bluetooth profiles, or applications, may reside above the protocol stack, and may utilize the services that are offered by the Bluetooth protocol stack.

Figure 2:
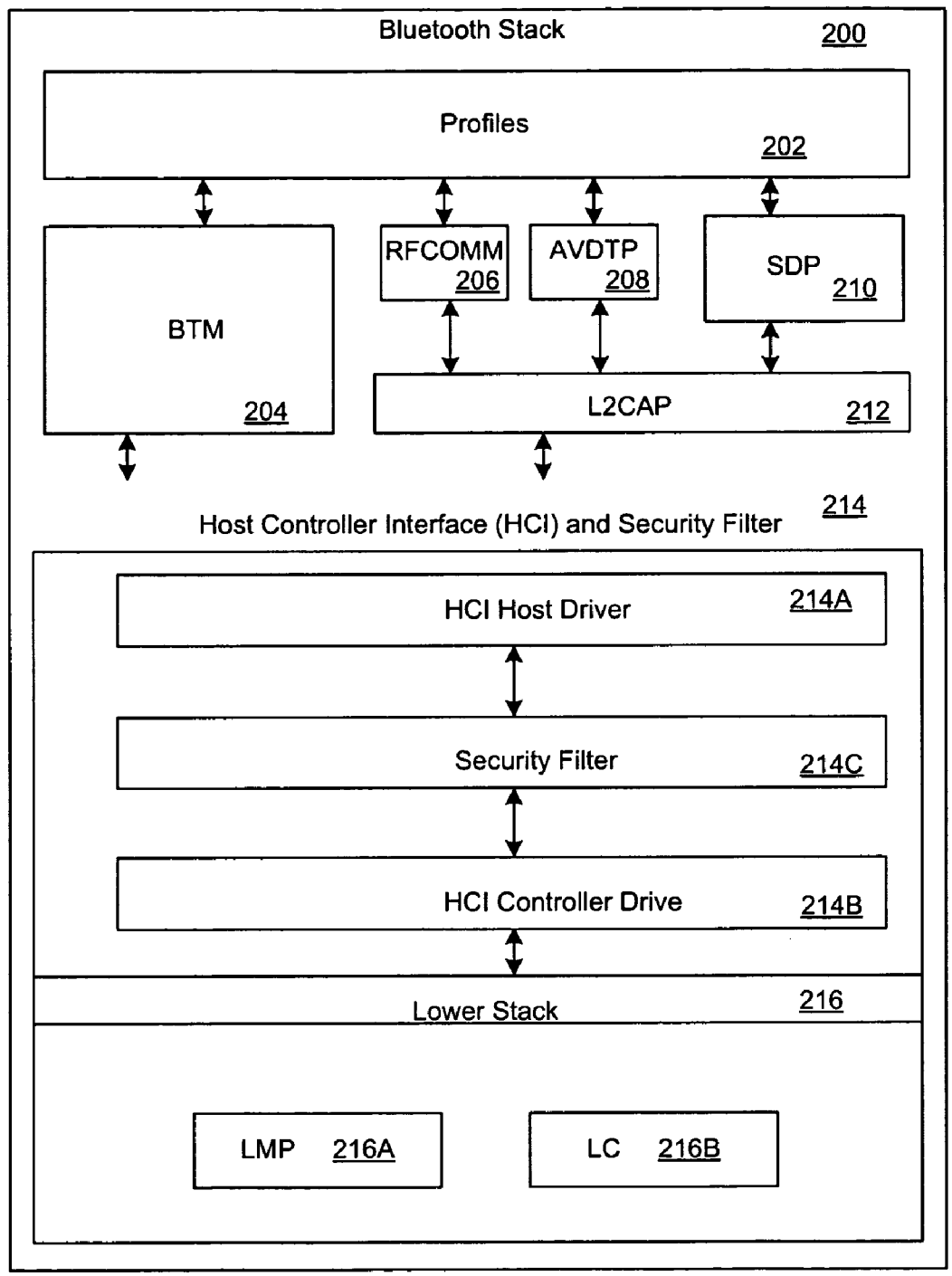
FIG. 2 is an exemplary Bluetooth protocol stack for managing Bluetooth communication using software or firmware filtering, in accordance with an embodiment of the invention.

FIG. 2 is an exemplary Bluetooth protocol stack, in accordance with an embodiment of the invention. Referring to FIG. 2, there is illustrated an exemplary Bluetooth protocol stack 200 with partitioning of the protocol stack at HCI level. The exemplary Bluetooth protocol stack 200 may comprise Bluetooth profiles layer 202, Bluetooth management entity (BTM) layer 204, radio frequency communication (RF-COMM) protocol 206, audio/video distribution transport protocol (AVDTP) 208, service discovery protocol (SDP) 210, logical link control and adaptation protocol (L2CAP) 212, host controller interface (HCI) 214, and a lower stack 216.

The lower stack 216 may comprise a link manager protocol (LMP) 216A and a link controller (LC) 216B. The link manager (LM) may be adapted to carry out link setup, authentication, link configuration and other protocols. The link manager may also discover other remote LM's and communicates with them via the LMP 216A. The LMP 216A may control the communication between various Bluetooth enabled devices, such as a phone and a PC.

To perform its service provider role, the LM may utilize the underlying Link Controller (LC) 216B. The LC 216B within the lower stack 216 may be adapted to handle Bluetooth baseband functions, such as encoding of voice and/or data packets, error correction, slot delimitation, frequency hopping, radio interface, data encryption, and/or link authentication.

The Host Controller Interface (HCI) 214 may be interface between the radio and the host computer. HCI 214 provides a uniform interface method for accessing Bluetooth hardware capabilities. HCI 214 may comprise HCI Host Driver 214A, HCI Controller Driver 214B and a security Filter 214C. The HCI Host Driver 214A may be implemented in software on the host. The HCI Host Driver 214A may be executed to send HCI commands, process HCI events, send and process received HCI packets. The HCI Controller Driver 214B may reside in firmware on the Bluetooth device. The HCI Controller Driver 214B may perform processing of the HCI commands, sending of the HCI events, processing HCI packets from the host, and encoding the received data packets and sending them towards the host. The security filter 214C may be embedded between HCI Host Driver 214A and HCI Controller Driver 214B. The security filter 214C may be used to enforce security communication settings configured by IT or system administration block 101 on the device, for example, the Bluetooth enabled device 103.

The L2CAP 212 may be utilized to pass packets between this and another Bluetooth-enabled device, support higher level protocol multiplexing, packet segmentation and reassembly, and quality of service (QoS), configure a high-speed connection between the two Bluetooth devices.

The SDP 210 may be utilized for querying Bluetooth device information, Bluetooth device services, and characteristics of the services.

The Audio/Video Distribution Transport Protocol (AVDTP) 208 is the protocol designed especially for Bluetooth streaming audio and video. It may perform the signaling that may be utilized to configure, open, and/or close a stream between two Bluetooth devices. An Audio stream data may be transferred utilizing real-time protocol (RTP) packets. AVDTP 208 resides in the protocol stack above L2CAP and may utilize separate L2CAP 212 channels for signaling and data. The RFCOMM protocol 206 may be utilized to provide emulation of RS-232 serial ports over the L2CAP 212 protocol, providing both transport capabilities for upper level services, such as OBEX, that use virtual serial line as the transport mechanism. The BTM layer 204 makes it possible for various equipment to have wireless communication by integration with a Bluetooth module. The Bluetooth profiles layer 202 may comprise Bluetooth profiles of one or more applications that may be utilized in connection with the Bluetooth protocol stack.

In operation, various Bluetooth profiles or application 202 may be used to transmit application data. The RFCOMM 206 may provide a virtual serial line to transport the received application data to L2CAP channel 212. The L2CAP 212 may encode the received application data into L2CAP format and may pass to the HCI 214. The HCI Host Driver 214A may be executed to send the HCI data packets. The HCI packets may be parsed in the security filter 214C for device security check to confirm the policies set by a system administrator. If a HCI data packet is allowed, the HCI Controller Driver 214B at the lower stack 216 may receives data from the host and passes it to LM/LC for transmission. In instances when the HCI packet in the security filter 214C is not allowed, an alert may be issued and the packet may be dropped.

Security settings may be enforced using the security filter 214C. The security filter 214C may have an access to the policy settings configured through the IT or system administration block 101. A certain connection attempt may be rejected. Stack attempt to set some not allowed parameter may be ignored, a certain HCI Command from the Bluetooth stack may be acknowledged by the security filter, so that not allowed setting may not be set on the radio.

Figure 3:
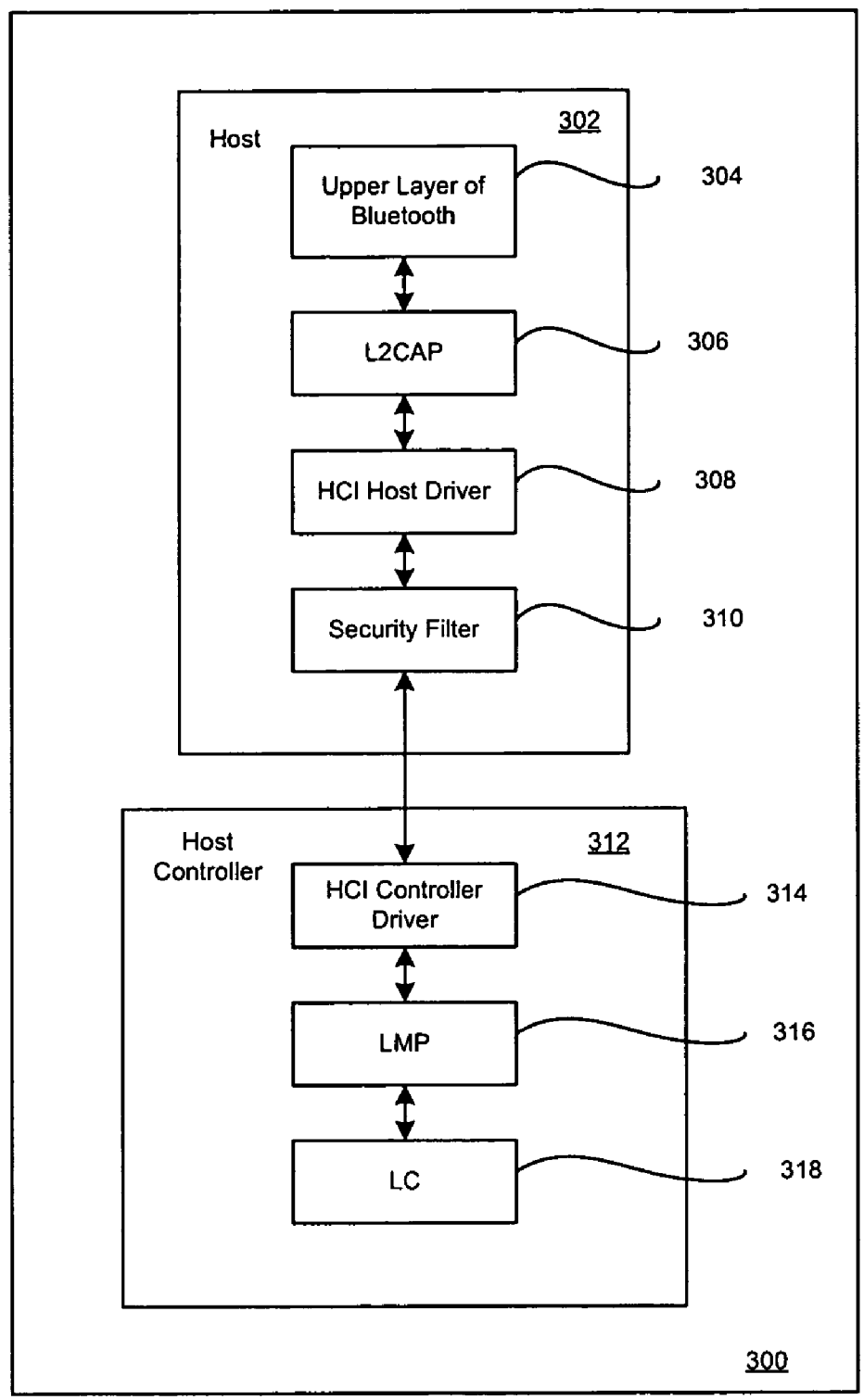
FIG. 3 illustrates an exemplary embodiment of the invention for managing Bluetooth communication using software filtering, in accordance with an embodiment of the invention.

FIG. 3 illustrates an exemplary embodiment of the invention for managing Bluetooth communication using software filtering, in accordance with an embodiment of the invention. Referring to FIG. 3, there is shown a Host 302 and Host Controller 312.

The Host 302 may comprise Upper Layer of Bluetooth 304, L2CAP layer 306, HCI Host Driver 308 and a Security Filter 310. The Upper Layer Bluetooth 304 may comprise applications and higher layer host driver that may enable communication with the various Bluetooth features. The L2CAP layer 306 may comprise a logical link control and adaptation protocol that may be utilized to exchange data packets with another Bluetooth enabled devices, also to support packet segmentation and reassembly. The HCI Host Driver 308 may be used to connect the Bluetooth host software to the device firmware on the medium, for example, USB and PC card. The security filter 310 may be implemented as software in the host 302 to ensure secure Bluetooth communication, such as device access control and security settings.

The Host Controller 312 may comprise HCI Controller Driver 314, LMP 316 and LC 318. The HCI Controller Driver 314 may be utilized to encode HCI packets to digital data to bridge the information exchange between software and hardware. The LMP 314 may be enabled to handle piconet management, link configuration and link security. The LC 318 may be enabled to establish and maintaining the links between Bluetooth units.

In operation upper layer application 304 may access the HCI Host driver 308 directly to set Host Controller 312 configuration. The HCI Host driver 308 may encode HCI commands and pass them down to the security filter 310. The security filter 310 may decode the command and check if this command is valid according to the current security policy. In instances where the command is allowed, the security filter 312 may pass the validated command down to the Host Controller 312. In instances where the command is not allowed, the security filter 312 may generate a negative acknowledgement for the HCI command and pass negative acknowledgement to the HCI Host driver 308 as if received from the device. The example of the HCI command that may be filtered out by the security filter 310 may be HCI_Set_Scan_Mode which sets Bluetooth Device discoverable.

In operation, when profile or application needs to send data packets L2CAP 306 may be utilized to send the packets. When L2CAP receives a packet from the upper layer it may encode the received packet into L2CAP format and may pass it to the HCI Host Driver 308. The HCI Host Driver 308 may encode the packet in the HCI data format. The HCI data formatted packet may be parsed in the security filter 310. The security filter 310 may be a part of Bluetooth software under the Bluetooth driver to determine whether the parsed packet is allowed based on the policy set by an IT Manager or a system administrator. In instances where the HCI data packet is allowed, the HCI Controller Driver 314 may receive HCI data packet and pass it down to the LMP 316 or LC 318 for the over the air transmission. An exemplary Bluetooth data packets that may be filtered out by the security filter 312 maybe an L2CAP Connect Request or RFCOMM SABME packet, which may be utilized to establish a connection for a specific service.

A LMP 316 or LC 318 may receive a data packet from the peer device. The packet may be passed to the HCI Controller Driver 314 to be transmitted to the host. The HCI Controller Driver 314 may encode the packet into the HCI data format and passes it up to the host. The Security filter 310 may validate if the packet is allowed based on the policy set by an IT Manager or a system administrator. In instances where the packet is allowed, the security filter 312 may pass the packet to the HCI Host Driver 308, from which it may be passed to the L2CAP 306 and then to the Upper Layers 304 and the application. In instances where the packet is not allowed, the security filter 312 may discard the packet. An example of a Bluetooth data packet that may be filtered out because of the policy settings may be a L2CAP Connection Request or RFCOMM SABME packet, which may be utilized to establish a connection for a specific service.

Figure 4:
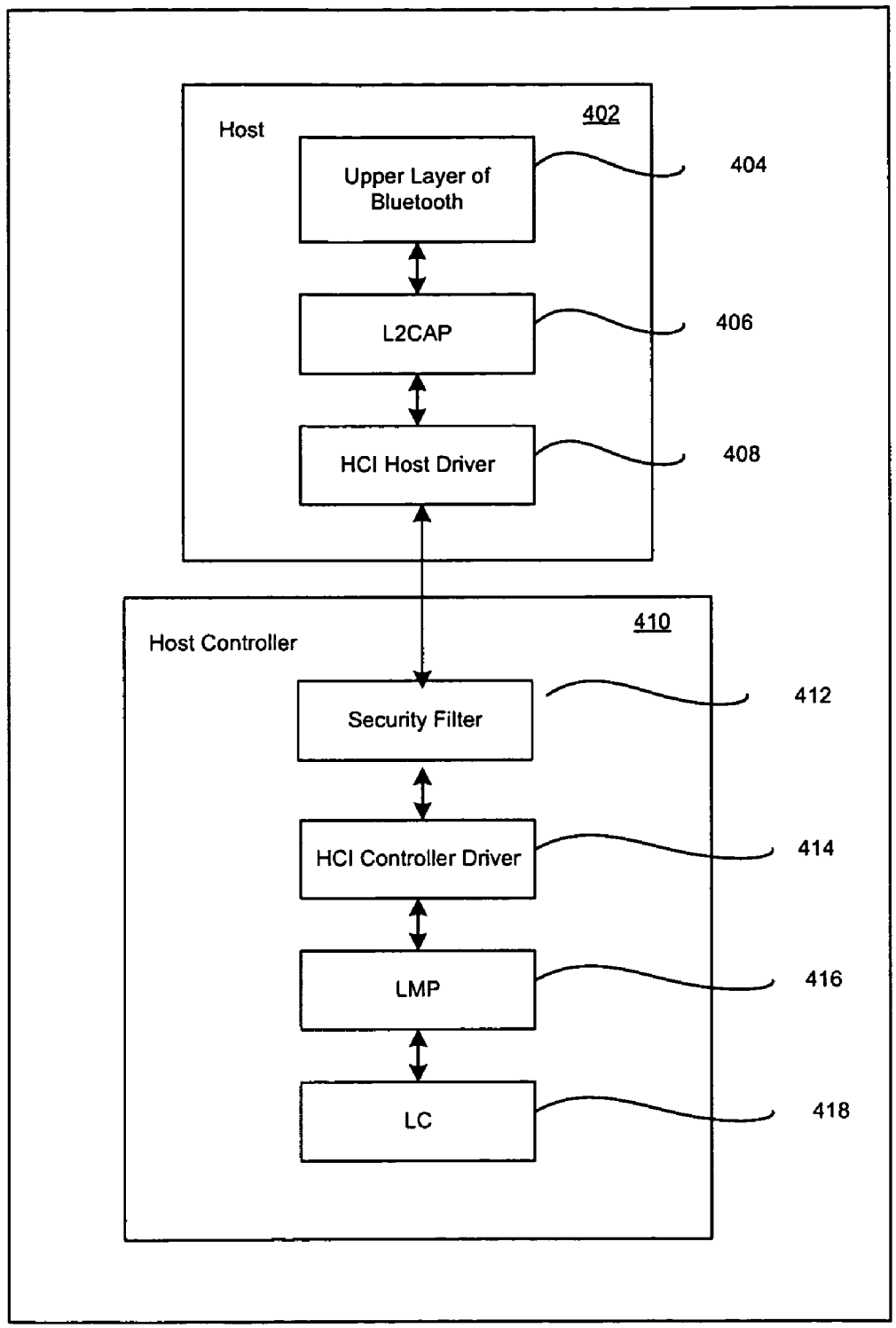
FIG. 4 illustrates another exemplary embodiment of the invention for managing Bluetooth communication using firmware filtering, in accordance with an embodiment of the invention.

FIG. 4 illustrates another exemplary embodiment of the invention for managing Bluetooth communication using firmware filtering, in accordance with an embodiment of the invention. Referring to FIG. 4, the system 400 may be similar to the system 300 of FIG. 3 with an exception that the security filter 412 may be integrated in the Bluetooth module just above the HCI Controller Driver 414 as firmware within the Host Controller 410.

In operation, the operational steps may be similar to those as described for FIG. 3 except filtering of the HCI commands as well as incoming and outgoing data packets may be executed in the security filter 412 incorporated in the firmware.

Figure 5:
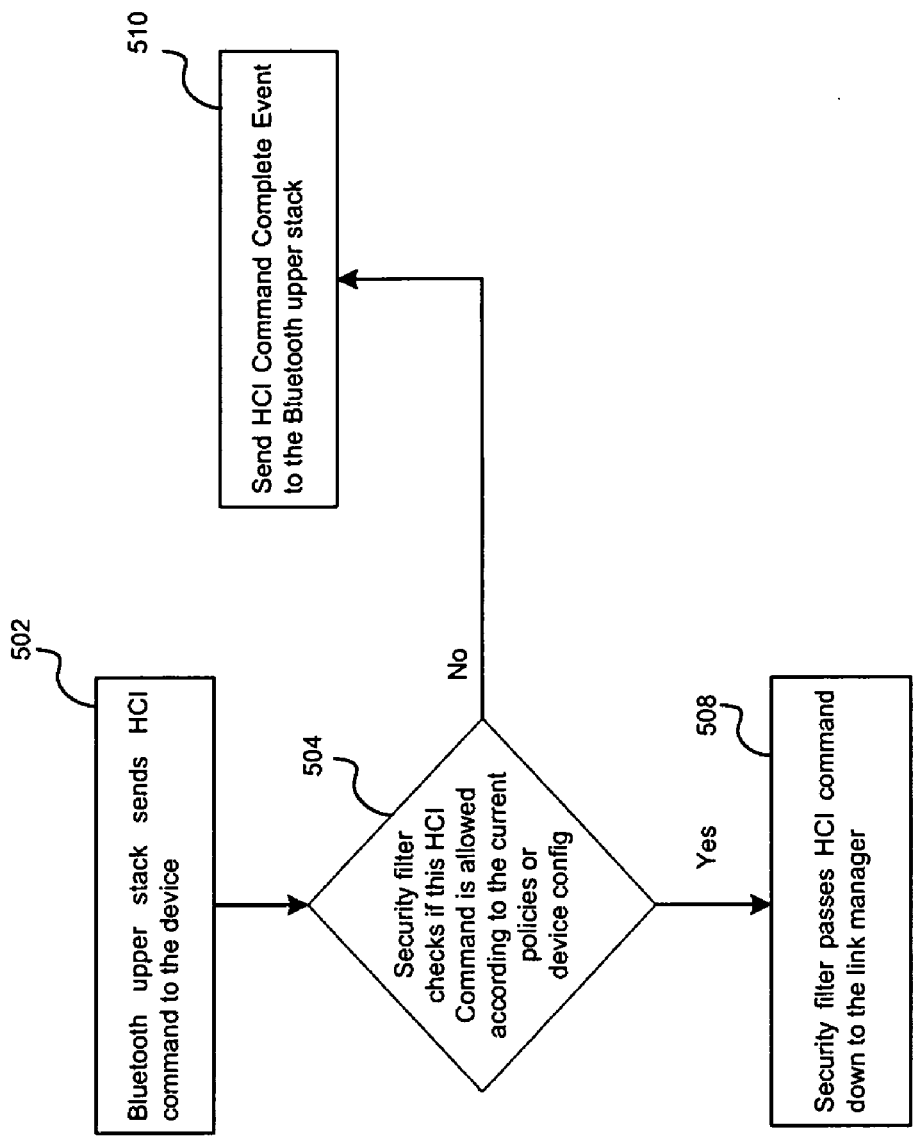
FIG. 5 is a flow chart illustrating exemplary steps for managing Bluetooth device configuration using software or firmware filtering, in accordance with an embodiment of the invention.

FIG. 5 is a flow chart illustrating exemplary steps for managing Bluetooth device configuration using software or firmware filtering, in accordance with an embodiment of the invention. Referring to FIG. 5, the exemplary steps begin in step 502, where due to an user intervention or some application logic, the upper layer may decide to send an HCI Command. In step 504, the security filter 310 or 412 may check whether the HCI Command may be valid based on the current policies and/or device security configuration. In instances where the HCI command is allowed, in step 508, the security filter 310 may pass the HCI Command down to the link manager 316 or 416. The LMP 416 or 516 may start to communicate with the LC 418 or 518 for the link setup and configuration accordingly. In instances where the HCI command is not allowed, then in step 510, a HCI command complete event may be sent to the Bluetooth upper stack. In this regard, the security filter 310 or 412 may prevent, for example, outgoing or incoming Bluetooth connections, pairing with other Bluetooth devices, configuring device to be discoverable or variety of other Bluetooth features.

Figure 6:
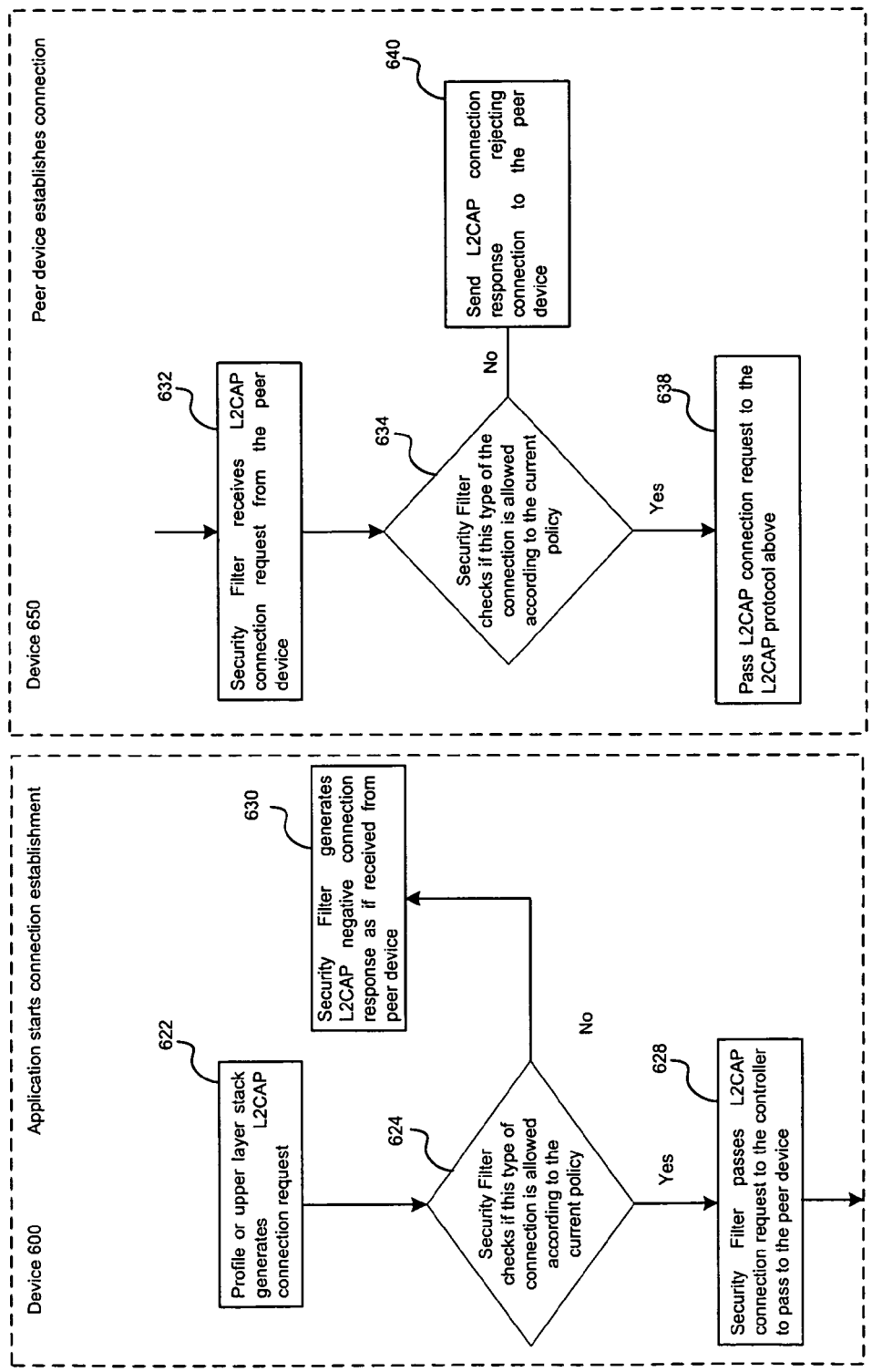
FIG. 6 is a flow chart illustrating exemplary steps for managing Bluetooth peer-to-peer communication using software or firmware filtering, in accordance with an embodiment of the invention.

FIG. 6 is a flow chart illustrating exemplary steps for managing Bluetooth peer-to-peer communication using software or firmware filtering, in accordance with an embodiment of the invention. Referring to FIG. 6, in step 622, on a Bluetooth enabled device 600, a profile or the upper layer stack may generate a connection request to the L2CAP 406. The L2CAP 406 may generate a L2CAP Connection Request data packet and may pass it to the HCI Host Driver 408. In step 624, the security filter 310 or 412 may determine if this type of connection is allowed according to the current policy or Bluetooth device configuration. In instances where the connection is allowed, in step 628, the security filter 410 may pass the L2CAP connection request to the Bluetooth Baseband Layer to be transmitted to the peer device 650. In instances where the connection is not allowed, in step 630, the security filter 310 or 412 may generate a L2CAP negative Connection Response as if it was received from the peer device 650.

On the receiving side of the connection, in step 632, on the Bluetooth enabled device 650, the security filter 310 or 412 may receive a L2CAP connection request from a managed or unmanaged device 600. In step 634, the security filter 310 or 412 may check whether the requested L2CAP connection may be allowed based on the current security policy. In instances where the connection may be allowed, in step 638, the security filter 310 or 412 may pass the L2CAP connection request to L2CAP 406. The L2CAP 406 may continue to setup the connection by sending the packet to the Application level. In instances where the connection may not be allowed, in step 640, the security filter 310 or 412 may generate a L2CAP negative Connection Response to reject the connection to the peer device 600.

Aspects of method and system for managing secure Bluetooth communication using software or firmware filtering are provided. Various exemplary embodiments of the invention may comprise receiving from a centralized network management entity 101, one or more messages by a Bluetooth device, for example, the Bluetooth device 103, that enable managing secure communication by the Bluetooth device 103. The centralized management entity 101 may comprise an administration console 101A. The Bluetooth device 103 may be configured to enable or disable one or more security policies based on the received one or more messages to enable the secure communication. The security policies may affects usage of one or more profiles and/or usage models. Transmission and/or reception of information between the Bluetooth device 103 and one or more other Bluetooth enabled devices may be controlled based on the configuration.

In accordance with various embodiments of the invention, HCI Commands originating from the Bluetooth upper layer stack, for example, the Bluetooth Host 302 or 402, associated with the Bluetooth device 103 may be filtered. HCI events originating from Bluetooth Controller Driver 314 or 414 associated with the Bluetooth device 103 may also be filtered. HCI data packets communicated to and from the Bluetooth device 103 may also be filtered. One or more HCI packets may be filtered via a firmware filter 310 which is communicatively coupled to a HCI Host Driver 308, and the firmware filter 310 and the HCI Host Driver 308 are part of a Bluetooth host 302 stack of Bluetooth device 103. One or more HCI packets may be filtered via a firmware filter 412 which is communicatively coupled to a HCI Controller Driver 414, and the firmware filter 412 and the HCI Controller Driver 414 are part of a Bluetooth host controller 410 stack of said Bluetooth device 103.

Another embodiment of the invention may provide a machine-readable storage, having stored thereon, a computer program having at least one code section executable by a machine, thereby causing the machine to perform the steps as described herein for managing Bluetooth communication using software or firmware filtering.

Accordingly, the present invention may be realized in hardware, software, or a combination of hardware and software.

The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   receiving from a centralized network management entity, one or more messages by a Bluetooth device that enable managing secure communication by said Bluetooth device;
   configuring by said Bluetooth device, a host control interface (HCI) of said Bluetooth device to enable or disable one or more security policies based on said received one or more messages to enable said secure communication; and
   filtering one or more HCI packets based on said configuration via a firmware filter which is communicatively coupled to a HCI layer, and said firmware filter and said HCI layer are part of one of: a Bluetooth host stack of said Bluetooth device and a Bluetooth host controller stack of said Bluetooth device.

2. The method according to claim 1, wherein said one or more security policies affects usage of one or more profiles and/or usage models.

3. The method according to claim 1, comprising controlling transmission and/or reception of information between said Bluetooth device and one or more other Bluetooth enabled devices based on said configuration.

4. The method according to claim 1, comprising filtering HCI Commands originating from a Bluetooth upper layer stack associated with said Bluetooth device based on said configuration.

5. The method according to claim 1, comprising filtering HCI events from a Bluetooth Controller Driver associated with said Bluetooth device based on said configuration.

6. The method according to claim 1, comprising filtering HCI data packets communicated to and from said Bluetooth device based on said configuration.

7. The method according to claim 1, wherein said centralized management entity comprises an administration console.

8. A system for processing signals, the system comprising:
   one or more circuits for use in a Bluetooth device, said one or more circuits being operable to:
   receive from a centralized network management entity, one or more messages that enable secure communication by said Bluetooth device;
   configure a host control interface (HCI) of said Bluetooth device to enable or disable one or more security policies based on said received one or more messages to enable said secure communication; and
   filter one or more HCI packets based on said configuration via a firmware filter which is communicatively coupled to a HCI layer, and said firmware filter and said HCI layer are part of one of: a Bluetooth host stack of said Bluetooth device and a Bluetooth host controller stack of said Bluetooth device.

9. The system according to claim 8, wherein said one or more security policies affects usage of one or more profiles and/or usage models.

10. The system according to claim 8, wherein said one or more circuits controls transmission and/or reception of information between said Bluetooth device and one or more other Bluetooth enabled devices based on said configuration.

11. The system according to claim 8, wherein said one or more circuits are operable to filter HCI Commands originating from a Bluetooth upper layer stack associated with said Bluetooth device based on said configuration.

12. The system according to claim 8, wherein said one or more circuits are operable to filter HCI events from a Bluetooth Controller Driver associated with said Bluetooth device based on said configuration.

13. The system according to claim 8, wherein said one or more circuits are operable to filter HCI data packets communicated to and from said Bluetooth device based on said configuration.

14. The system according to claim 8, wherein said centralized management entity comprises an administration console.

15. A non-transitory computer-readable medium embodying a program executable in a computing device, the program comprising:
   code that receives from a centralized network management entity, one or more messages that enable secure communication by a Bluetooth device;
   code that configures a host control interface (HCI) of said Bluetooth device to enable or disable one or more security policies based on said received one or more messages to enable said secure communication; and
   code that filters one or more HCI packets based on said configuration via a firmware filter which is communicatively coupled to a HCI layer, and said firmware filter and said HCI layer are part of one of: a Bluetooth host stack of said Bluetooth device and a Bluetooth host controller stack of said Bluetooth device.

16. The non-transitory computer-readable medium according to claim 15, wherein said one or more security policies affects usage of one or more profiles and/or usage models.

17. The non-transitory computer-readable medium according to claim 15, wherein the program further comprises code that controls transmission and/or reception of information between said Bluetooth device and one or more other Bluetooth enabled devices based on said configuration.

18. The non-transitory computer-readable medium according to claim 15, wherein the program further comprises code that filters HCI Commands originating from a Bluetooth upper layer stack associated with said Bluetooth device based on said configuration.

19. The non-transitory computer-readable medium according to claim 15, wherein the program further comprises code that filters HCI events from a Bluetooth Controller Driver associated with said Bluetooth device based on said configuration.

20. The non-transitory computer-readable medium according to claim 15, wherein the program further comprises code that filters HCI data packets communicated to and from said Bluetooth device based on said configuration.

* * * * *